(12) United States Patent
Tang et al.

(10) Patent No.: US 8,930,413 B2
(45) Date of Patent: Jan. 6, 2015

(54) DYNAMIC STRUCTURE FOR A MULTI-TENANT DATABASE

(75) Inventors: Weng Sing Tang, Singapore (SG); Liang Xu, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 13/342,530

(22) Filed: Jan. 3, 2012

(65) Prior Publication Data

US 2013/0173669 A1 Jul. 4, 2013

(51) Int. Cl.
*G06F 17/30* (2006.01)

(52) U.S. Cl.
USPC ............................ 707/803; 707/809; 707/812

(58) Field of Classification Search
CPC .................................. G06F 17/30; G06F 17/00
See application file for complete search history.

(56) References Cited

U.S. PATENT DOCUMENTS

| | | | |
|---|---|---|---|
| 6,212,524 B1 * | 4/2001 | Weissman et al. | 707/600 |
| 6,587,854 B1 * | 7/2003 | Guthrie et al. | 1/1 |
| 7,529,728 B2 * | 5/2009 | Weissman et al. | 1/1 |
| 7,779,039 B2 * | 8/2010 | Weissman et al. | 707/793 |
| 7,949,684 B2 * | 5/2011 | Brooks et al. | 707/802 |
| 8,112,445 B2 * | 2/2012 | Weissman et al. | 707/790 |
| 8,229,922 B2 * | 7/2012 | Weissman et al. | 707/715 |
| 8,275,763 B2 * | 9/2012 | Weissman et al. | 707/713 |
| 8,280,874 B2 * | 10/2012 | Weissman et al. | 707/716 |
| 8,280,875 B2 * | 10/2012 | Weissman et al. | 707/716 |
| 8,321,405 B2 * | 11/2012 | Weissman et al. | 707/716 |
| 8,332,387 B2 * | 12/2012 | Weissman et al. | 707/716 |
| 8,335,781 B2 * | 12/2012 | Weissman et al. | 707/716 |
| 8,601,467 B2 * | 12/2013 | Hofhansl et al. | 717/177 |
| 8,635,232 B2 * | 1/2014 | Brooks et al. | 707/756 |
| 2002/0095430 A1 * | 7/2002 | Egilsson et al. | 707/104.1 |
| 2003/0023608 A1 * | 1/2003 | Egilsson et al. | 707/100 |
| 2005/0065925 A1 * | 3/2005 | Weissman et al. | 707/4 |
| 2005/0223022 A1 * | 10/2005 | Weissman et al. | 707/102 |
| 2005/0283478 A1 * | 12/2005 | Choi et al. | 707/9 |
| 2007/0150856 A1 * | 6/2007 | Warner et al. | 717/106 |
| 2008/0201701 A1 * | 8/2008 | Hofhansl et al. | 717/168 |
| 2009/0055439 A1 * | 2/2009 | Pai et al. | 707/200 |

(Continued)

OTHER PUBLICATIONS

Aulbach, Stephan, et al., "Multi-Tenant Databases for Software as a Service: Schema-Mapping Techniques," ACM SIGMOD '08, Jun. 9-12, 2008, pp. 1195-1206.*

(Continued)

*Primary Examiner* — Farhan Syed
(74) *Attorney, Agent, or Firm* — Garg Law Firm, PLLC; Rakesh Garg; William J. Stock

(57) ABSTRACT

Embodiments for using a dynamic structure of tables in a schema of a multi-tenant database are provided. For a tenant schema including a set of tenant tables, a label is created for a tenant table in the set of tenant tables. The label is partitioned into a set of constituent primary labels. A subset of columns is selected from the set of n columns of the tenant table, the subset of columns corresponding to a primary label in the set of constituent primary labels. The subset of columns is mapped to a table in the dynamic structure of tables in the schema of the multi-tenant database, the table in the dynamic structure of tables having the primary label. In the multi-tenant database executing in a data processing system, the dynamic structure of tables is populated with data from the tenant schema according to the mapping.

17 Claims, 7 Drawing Sheets

(56) References Cited

U.S. PATENT DOCUMENTS

| | | | |
|---|---|---|---|
| 2009/0276395 A1* | 11/2009 | Weissman et al. | 707/2 |
| 2010/0125612 A1* | 5/2010 | Amradkar et al. | 707/802 |
| 2010/0169957 A1* | 7/2010 | Zurko | 726/5 |
| 2010/0205227 A1* | 8/2010 | Weissman et al. | 707/803 |
| 2010/0211619 A1* | 8/2010 | Weissman et al. | 707/812 |
| 2010/0217758 A1* | 8/2010 | Weissman et al. | 707/713 |
| 2010/0223254 A1* | 9/2010 | Weissman et al. | 707/716 |
| 2010/0223255 A1* | 9/2010 | Weissman et al. | 707/716 |
| 2010/0250608 A1* | 9/2010 | Malviya et al. | 707/792 |
| 2010/0281014 A1* | 11/2010 | Weissman et al. | 707/715 |
| 2010/0281015 A1* | 11/2010 | Weissman et al. | 707/716 |
| 2010/0281016 A1* | 11/2010 | Weissman et al. | 707/716 |
| 2011/0106789 A1* | 5/2011 | Gao et al. | 707/713 |
| 2011/0225167 A1* | 9/2011 | Bhattacharjee et al. | 707/747 |
| 2011/0238709 A1* | 9/2011 | Liu et al. | 707/803 |
| 2011/0270832 A1* | 11/2011 | Le Stum | 707/736 |
| 2011/0276601 A1* | 11/2011 | Pin et al. | 707/783 |
| 2011/0282872 A1* | 11/2011 | Oksman et al. | 707/727 |
| 2011/0289091 A1* | 11/2011 | Collins et al. | 707/741 |
| 2011/0296381 A1* | 12/2011 | Mooney | 717/122 |
| 2012/0016913 A1* | 1/2012 | Tamm et al. | 707/805 |
| 2012/0041986 A1* | 2/2012 | Weissman et al. | 707/793 |
| 2012/0054241 A1* | 3/2012 | Brooks et al. | 707/781 |
| 2012/0059853 A1* | 3/2012 | Jagota | 707/780 |
| 2012/0066160 A1* | 3/2012 | Jagota | 706/12 |
| 2012/0197916 A1* | 8/2012 | Tobin et al. | 707/756 |
| 2012/0254258 A1* | 10/2012 | Gao et al. | 707/803 |
| 2012/0310965 A1* | 12/2012 | Gao et al. | 707/762 |
| 2013/0031172 A1* | 1/2013 | Olsen et al. | 709/204 |
| 2013/0031499 A1* | 1/2013 | Vishnubhatta et al. | 715/765 |
| 2013/0060859 A1* | 3/2013 | Olsen et al. | 709/204 |
| 2013/0061156 A1* | 3/2013 | Olsen et al. | 715/753 |
| 2013/0117191 A1* | 5/2013 | Jagota et al. | 705/320 |
| 2013/0117287 A1* | 5/2013 | Jagota et al. | 707/755 |
| 2013/0117353 A1* | 5/2013 | Wong et al. | 709/203 |
| 2013/0132861 A1* | 5/2013 | Kienzle et al. | 715/753 |
| 2013/0166489 A1* | 6/2013 | Jagota | 706/46 |
| 2013/0198652 A1* | 8/2013 | Dunn et al. | 715/751 |
| 2013/0246445 A1* | 9/2013 | Tobin et al. | 707/756 |

OTHER PUBLICATIONS

Shao, Qihong, "Towards Effective and Intelligent Multi-tenancy SaaS," May 2011, Doctoral Thesis, Arizona State University, pp. 1-303 (303 total pages).*

Gao, Bo, et al., "A non-intrusive multi-tenant database for large scale SaaS application," 2011, 8th IEEE International Conference on e-Business engineering, pp. 324-328 (5 total pages).*

Wang, Hua, et al., "Software Architecture Driven Configurability of Multi-tenant SaaS Application," 2010, WISM, LNCS, pp. 418-424 (7 total pages).*

Banville, Richard, et al., "OpenEdge Multi-tenancy overview," 2012, Progress Software, pp. A1-A27 (29 total pages).*

Hui et al; Supporting Database Applications as a Service.

Aulbach et al; Multi-Tenant Databases for Software as a Service: Schema-Mapping Techniques, SIGMOD'08, Jun. 9-12, 2008, Vancouver, BC, Canada.

A multiple sparse tables approach for multi-tenant data storage in SaaS.

* cited by examiner

| C1 | C2 | C3 |
|----|----|----|

402 TENANT TABLE 1 (T1). BINARY LABEL: 10; TERNARY LABEL: 2

| C1 | C2 | C3 | C4 |
|----|----|----|----|

404 TENANT TABLE 2 (T2). BINARY LABEL: 11; TERNARY LABEL: 10

| C1 | C2 | C3 | C4 | C5 |
|----|----|----|----|----|

406 TENANT TABLE 3 (T3). BINARY LABEL: 100; TERNARY LABEL: 11

| C1 | C2 | C3 | C4 | C5 | C6 |
|----|----|----|----|----|----|

408 TENANT TABLE 4 (T4). BINARY LABEL: 101; TERNARY LABEL: 12

| C1 | C2 | C3 | C4 | C5 | C6 | C7 |
|----|----|----|----|----|----|----|

410 TENANT TABLE 5 (T5). BINARY LABEL: 110; TERNARY LABEL: 20

| C1 | C2 | C3 | C4 | C5 | C6 | C7 | C8 |
|----|----|----|----|----|----|----|----|

412 TENANT TABLE 6 (T6). BINARY LABEL: 111; TERNARY LABEL: 21

*FIG. 4*

| C1 | C2 |
|----|----|

502 SERVER TABLE 1. BINARY LABEL: 1

| C1 | C2 | C3 |
|----|----|----|

504 SERVER TABLE 2. BINARY LABEL: 10

| C1 | C2 | C3 | C4 | C5 |
|----|----|----|----|----|

506 SERVER TABLE 3. BINARY LABEL: 100

| C1 | C2 | C3 | C4 | C5 | C6 | C7 | C8 | C9 |
|----|----|----|----|----|----|----|----|----|

508 SERVER TABLE 4. BINARY LABEL: 1000

*FIG. 5*

600

602 SERVER TABLE 1. BINARY LABEL: 1

| C1 | C2 |
|---|---|
| T2C1 | T2C2 |
| T4C1 | T4C2 |
| T6C1 | T6C2 |

604 SERVER TABLE 2. BINARY LABEL: 10

| C1 | C2 | C3 |
|---|---|---|
| T1C1 | T1C2 | T1C3 |
| T2C1 | T2C3 | T2C4 |
| T5C1 608 | T5C2 612 | T5C3 614 |
| T6C1 | T6C3 | T6C4 |

606 SERVER TABLE 3. BINARY LABEL: 100

| C1 | C2 | C3 | C4 | C5 |
|---|---|---|---|---|
| T3C1 | T3C2 | T3C3 | T3C4 | T3C5 |
| T4C1 | T4C3 | T4C4 | T4C5 | T4C6 |
| T5C1 610 | T5C4 616 | T5C5 618 | T5C6 620 | T5C7 622 |
| T6C1 | T6C5 | T6C6 | T6C7 | T6C8 |

FIG. 10

```
    START
      │
      ▼
┌─────────────────────────┐
│ CREATE A SET OF TABLES, FOR │
│ A DYNAMIC STRUCTURE SCHEMA │
│ OF A MULTI-TENANT DATABASE │
│ EACH TABLE HAVING A LABEL │
│  THAT IS A PRIMARY LABEL  │
│ UNDER A GIVEN M-NARY SYSTEM│
│          1002             │
└─────────────────────────┘
      │
      ▼
     END
```

1000

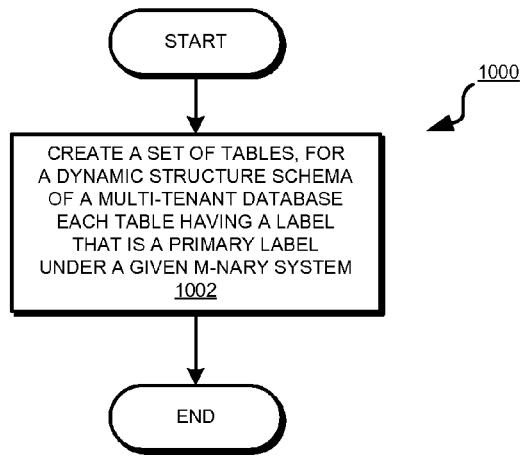

| C1 | C2 |
|----|----|

702 SERVER TABLE 1. TERNARY LABEL: 1_1

| C1 | C2 |
|----|----|

704 SERVER TABLE 2. TERNARY LABEL: 1_2

| C1 | C2 | C3 | C4 |
|----|----|----|----|

706 SERVER TABLE 3. TERNARY LABEL: 10_1

| C1 | C2 | C3 | C4 |
|----|----|----|----|

708 SERVER TABLE 4. TERNARY LABEL: 10_2

| C1 | C2 | C3 | C4 | C5 | C6 | C7 | C8 | C9 | C10 |
|----|----|----|----|----|----|----|----|----|-----|

710 SERVER TABLE 5. TERNARY LABEL: 100_1

| C1 | C2 | C3 | C4 | C5 | C6 | C7 | C8 | C9 | C10 |
|----|----|----|----|----|----|----|----|----|-----|

712 SERVER TABLE 6. TERNARY LABEL: 100_2

FIG. 8

| C1 | C2 |
|---|---|
| T1C1 | T1C2 |
| T3C1 | T3C2 |
| T4C1 | T4C2 |
| T6C1 | T6C2 |

SERVER TABLE 1. TERNARY LABEL: 1_1

| C1 | C2 |
|---|---|
| T1C1 | T1C3 |
| T4C1 | T4C3 |

SERVER TABLE 2. TERNARY LABEL: 1_2

| C1 | C2 | C3 | C4 |
|---|---|---|---|
| T2C1 | T2C2 | T2C3 | T2C4 |
| T3C1 | T3C3 | T3C4 | T3C5 |
| T4C1 | T4C4 | T4C5 | T4C6 |
| T5C1 | T5C2 | T5C3 | T5C4 |
| T6C1 | T6C3 | T6C4 | T6C5 |

SERVER TABLE 3. TERNARY LABEL: 10_1

| C1 | C2 | C3 | C4 |
|---|---|---|---|
| T5C1 | T5C5 | T5C6 | T5C7 |
| T6C1 | T6C6 | T6C7 | T6C8 |

SERVER TABLE 4. TERNARY LABEL: 10_2

DYNAMIC STRUCTURE FOR A MULTI-TENANT DATABASE

BACKGROUND

1. Technical Field

The present invention relates generally to a method, system, and computer program product for efficient storage of data in databases. More particularly, the present invention relates to a method, system, and computer program product for creating and using a dynamic storage structure for efficient storage of data in multi-tenant database systems.

2. Description of the Related Art

A database can be used by a variety of applications for storing their respective data. For example, in a business organization, a common installation of a database may be used by the finance department to store financial data, by the human resources department to store employee information, by the development team to store product design data, and by many other departments in a similar manner.

Particularly, in a Software as a Service (SaaS) model, a database can be a service that is utilized, not just by different applications within an organization, but also by a diverse group of clients. Each client using a database service typically has client-specific data that the client stores in the database. Each client, or more particularly, each application, that stores data in a shared database is a "tenant" of the database. A database that provides data storage to multiple tenants is called a multi-tenant database.

SUMMARY

The illustrative embodiments provide a method, system, and computer program product for a dynamic structure for a multi-tenant database. An embodiment creates, for a tenant schema including a set of tenant tables, a label for a tenant table in the set of tenant tables. The embodiment partitions the label into a set of constituent primary labels. The embodiment selects a subset of columns from the set of n columns of the tenant table, the subset of columns corresponding to a primary label in the set of constituent primary labels. The embodiment maps the subset of columns to a table in the dynamic structure of tables in the schema of the multi-tenant database, the table in the dynamic structure of tables having the primary label. The embodiment populates, in the multi-tenant database executing in a data processing system, the dynamic structure of tables with data from the tenant schema according to the mapping.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts an example tenant schema that can be mapped to a dynamic table structure in a server schema in accordance with an illustrative embodiment;

FIG. 5 depicts an example dynamic table structure created for a multi-tenant database schema using base 2 labels in accordance with an illustrative embodiment;

FIG. 7 depicts another example dynamic table structure created for a multi-tenant database schema using base 3 labels in accordance with an illustrative embodiment;

FIG. 8 depicts another example mapping of a tenant schema to a dynamic structure of a multi-tenant database schema in accordance with an illustrative embodiment;

FIG. 10 depicts a flowchart of a process of constructing a dynamic structure schema for a multi-tenant database in accordance with an illustrative embodiment.

DETAILED DESCRIPTION

Figure 1:
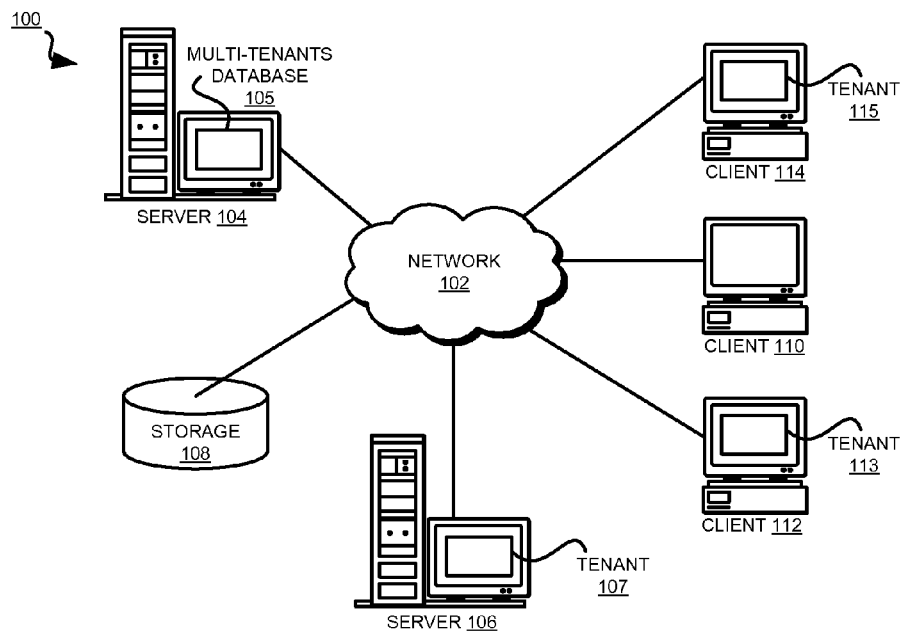
FIG. 1 depicts a pictorial representation of a network of data processing systems in which illustrative embodiments may be implemented.

Data is stored in a database according to a schema. For a multi-tenant database, the schema is designed with the diverse needs of the various possible tenants in mind. Presently available database architectures that support multiple tenants concurrently usually fall into one of the following three categories. The first of the three categories is separate databases for each tenant. In this approach, each tenant is provided with a separate instance of the multi-tenant database, and a tenant specific instance contains the tenant specific schema to store the tenant specific data.

The separate databases approach allows database-specific customizations for individual tenants. However, the illustrative embodiments recognize that this approach is not scalable because most servers that host databases limit the number of database instances that can execute on the server concurrently. Such a limit is often necessitated by service level agreements and other performance considerations because increasing the number of database instances on a data processing system adversely affects the performance of the data processing system The second of the three categories is a "shared database separate table" configuration in which an instance of the database is shared but includes separate tables for each tenant. In other words, a schema of a single database instance is architected to include all the schemas of all the tenants, thereby including each table of each tenant's schema in the schema of the multi-tenant database. The illustrative embodiments recognize that this approach achieves a better utilization of the computing resources available on a server, as compared to the separate databases approach. However, the illustrative embodiments also recognize that a fundamental limitation associated with the separate tables approach is that a database is often limited in the number of tables the database can use before either the performance of the database becomes unacceptable or the database reaches a design limit on the number of tables.

For example, a commercially available database typically allocates at least 4 Kilo Bytes (KB) of memory for each table. A typical blade server supports up to ten thousand tenants. Assuming that each tenant uses ten tables, the server has to support one hundred thousand tables. The database will allocate at least 400 Mega Bytes (MB) of the server's memory just to instantiate and become usable. Of course, the tables typically grow in size beyond the initial 4 KB due to the amount of data stored in the tables.

The illustrative embodiments recognize that with a large number of tables and the limited buffer pool, the performance of the database can degrade significantly. The database performance may fall below an acceptable performance level, other applications on the server, or the server as a whole may perform sub-optimally. In the worst case scenario, the database or the server may suffer a failure.

The third category includes a "shared database with shared tables" approach. This presently used approach promises better utilization of the server's resources as compared to the "shared database separate tables" approach. However, the illustrative embodiments recognize that because the schemas of the tables owned by different tenants are typically diverse from tenant to tenant, and are likely to evolve over time, a requirement of this approach is a database architecture that provides flexible schema support. While online, a production database typically lacks data definition language (DDL) support. Therefore, a challenging problem with the presently used "shared database shared tables" approach lies in mapping variable tenant schemas to a fixed server schema that is shared amongst the tenants.

One presently used solution to create such a server schema is the "universal table" approach, which merges different tenant schemas into a wide table. The wide table in the server's schema includes all the columns of all the tables of all the schemas of all the tenants.

Every row in the wide table is augmented with a tenant column and a table column to allow mapping back to the tenants' schemas. The data columns in the wide table are set to a flexible data type, such as VARCHAR, to facilitate sharing the wide table for a variety of data contents.

The illustrative embodiments recognize a problem with this universal table approach in that the rows of the wide table have to necessarily be wide enough to accommodate the various tables for the various tenants, resulting in a large number of null values in the rows. The number of null values in a row of the wide table further increases if the row is populated from a narrow data source, such as a tenant table with very few columns.

Another presently used solution to create a server schema is the "multiple sparse tables" approach. The multiple sparse tables approach attempts to reduce the null values in the wide table to improve query performance. However, the illustrative embodiments recognize that the resulting tables in the multiple sparse tables are, as the name suggests, sparse, to with, replete with null values. The illustrative embodiments further recognize that when data migration is needed, data migration between sparse tables is difficult and inefficient.

Another presently used method for designing server schema of a multi-tenant database is a "fully transposed storage model" approach. In a fully transposed storage model approach, tenant tables are decomposed into a one-table-one-data-column configuration, also known as binary relations. In other words, each table in the server schema includes a data column from a table in a tenant's schema and a primary key column of that table.

Thus, in this storage model, a tenant table with N data columns is decomposed into N−1 binary relations tables. When multiple variable schemas are utilized by the tenants, the binary relations can be fully shared without introducing any nulls. However, the illustrative embodiments recognize that the number of joins needed to reconstruct the tenant table is of order (N) (O(N)) computational complexity, making related queries very expensive to perform with increasing value of N.

The illustrative embodiments used to describe the invention generally address and solve the above-described problems related to multi-tenant database schemas. The illustrative embodiments provide a method, system, and computer program product for a dynamic structure for a schema of a multi-tenant database. More precisely, the illustrative embodiments describe a method, system, and computer program product, using which a suitable dynamic structure for a server schema of a multi-tenant database can be selected from a family of dynamic structures.

The illustrative embodiments describe a family of database schema architectures that fully consolidate tenants' tables with flexible schemas without introducing any additional null values as in the prior art. Furthermore, using a dynamic structure according to an embodiment in a multi-tenant database schema, the reconstruction complexity for a tenant table with N data columns is $O(\log(N))$, which is a significant improvement in efficiency over the presently available fully transposed storage models having $O(N)$ complexity.

The illustrative embodiments are described using specific bases only as examples and are not limiting on the illustrative embodiments. The illustrative embodiments can be used with other bases—such as with base 5 or base 10 as opposed to the described example base 2 or base 3, within the scope of the illustrative embodiments.

The illustrative embodiments are described with respect to certain data and data structures. Such descriptions are not intended to be limiting on an embodiment of the invention.

Furthermore, the illustrative embodiments may be implemented with respect to any type of data, data source, or access to a data source over a data network. Any type of data application or storage device may provide the data, such as data from a database, a flat file, an index file, or any data repository in general, to an embodiment of the invention, either locally at a data processing system or over a data network, within the scope of an embodiment of the invention.

The illustrative embodiments are further described with respect to certain applications, such as a relational database, only as examples. Such descriptions are not intended to be limiting on an embodiment of the invention. An embodiment of the invention may be implemented with respect to any type of application, such as, for example, other types of databases or a component thereof, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle Corporation and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
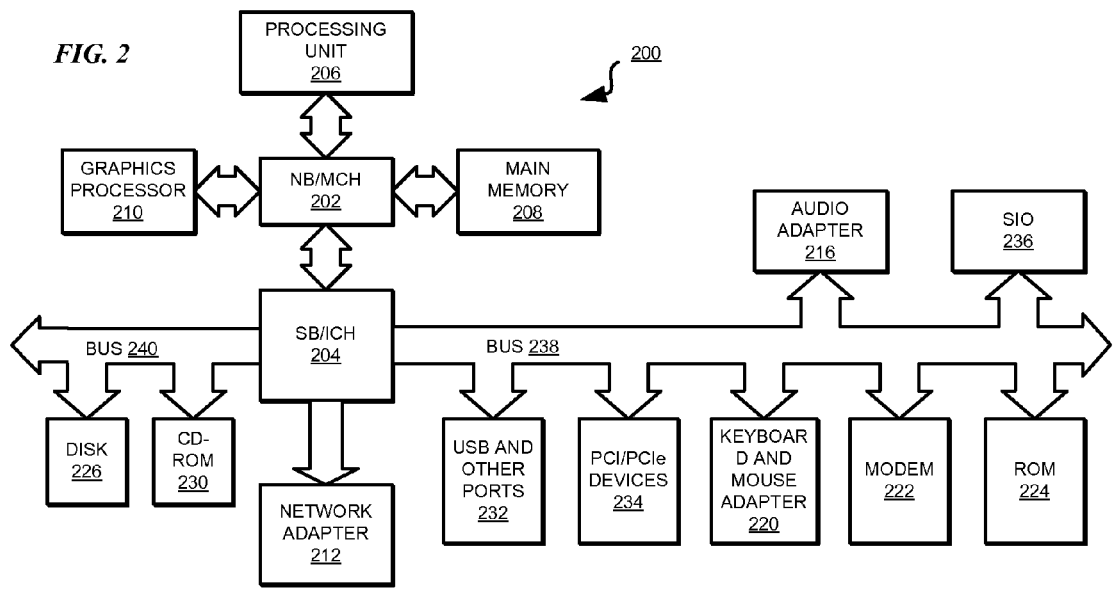
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

As an example, server 104 includes multi-tenant database 105, a component of which can implement an embodiment. For example, a schema design tool associated with multi-tenant database 105 can be modified or augmented with features of an embodiment. Of course, an embodiment can be implemented in an application separate from multi-tenant database 105 as well (not shown). Client 112 includes example tenant 113, which may be any suitable application that uses multi-tenant database 105 for data storage. Client 114 includes another example tenant 115, which may be another suitable application that uses multi-tenant database 105 for data storage. Server 106 includes example tenant 107, which may be another suitable application that uses multi-tenant database 105 for data storage. Analysis and recommendation component 115 may implement an embodiment. Multi-tenant database 105 or a component thereof implementing an embodiment can be implemented as computer usable code, or program instructions, that can be stored using a data storage device and executed using a processor.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example computer that can be used to implement a method according to an embodiment, a computer usable program product according to an embodiment, or a system according to an embodiment.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
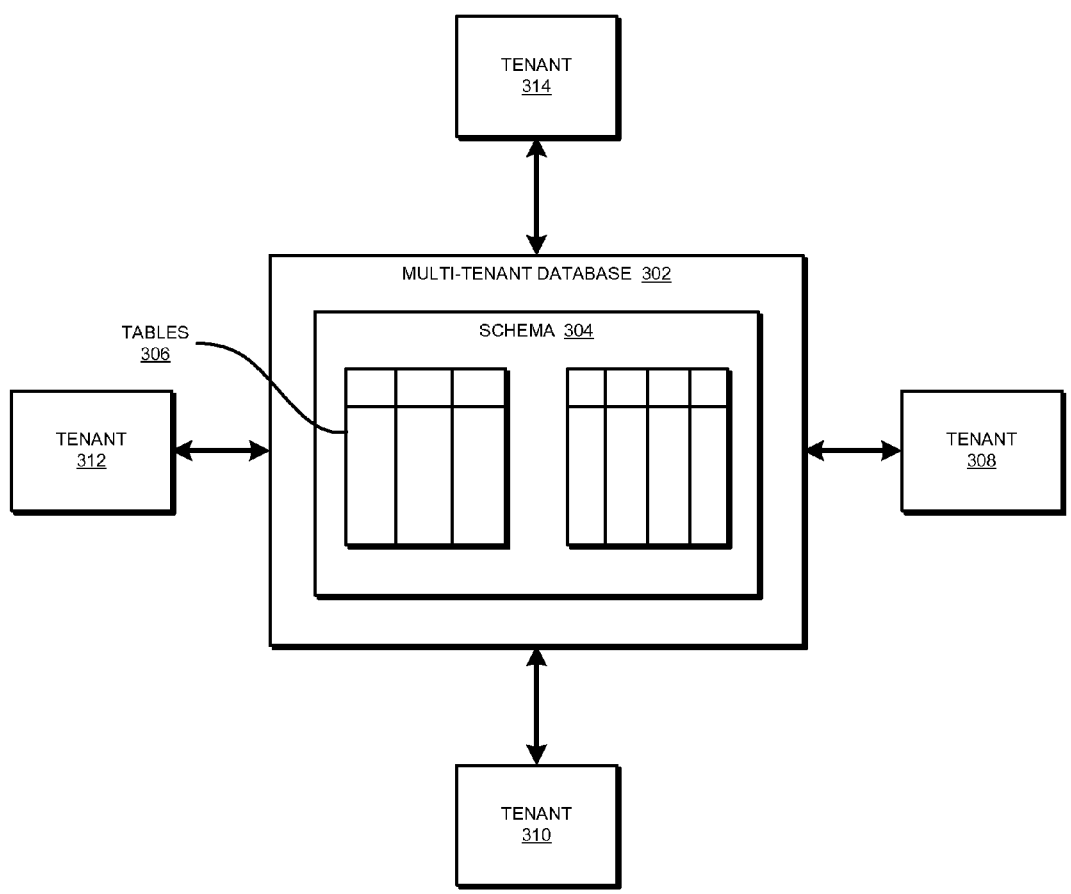
FIG. 3 depicts a block diagram of a multi-tenant database whose schema can be improved using an illustrative embodiment.

With reference to FIG. 3, this figure depicts a block diagram of a multi-tenant database whose schema can be improved using an illustrative embodiment. Multi-tenant database 302 is analogous to multi-tenant database 105 in FIG. 1.

Multi-tenant database 302 includes schema 304, which includes any number of tables 306. Schema 304 is a schema architected using any prior art methods, and tables 306 are in any type of relationships with each other according to such prior art architecture.

Tenants 308, 310, 312, and 314 are any suitable tenants that utilize multi-tenant database 302. In an embodiment, tenants 308, 310, 312, and 314 are a combination of a tenant on the same server as multi-tenant database 302, a tenant on the same network as multi-tenant database 302—such as a local area network (LAN), and a tenant on a different network—such as on a different LAN connecting over a wide area network (WAN).

A multi-tenant database architecture according to an embodiment modifies schema 304 to support multiple tenants concurrently. In an embodiment, schema 304 modified according to an embodiment provides each of tenants 308, 310, 312, and 314 with a separate view of multi-tenant database 302, giving the impression to a particular tenant, such as tenant 308, that the tenant is using a dedicated server or database, and hiding the presence of other tenants on multi-tenant database 302, such as the presence of tenants 310, 312, and 314.

With reference to FIG. 4, this figure depicts an example tenant schema that can be mapped to a dynamic table structure in a server schema in accordance with an illustrative embodiment. Tenant schema 400 is an example schema implemented by a tenant, such as tenant 308 in FIG. 3.

Tenant schema 400 includes a set of tables, each table in the set of tables including a set of columns. A set of tables is one or more table. A set of columns is one or more columns.

As an example, tenant schema 400 is shown to include table 402 labeled "T1", table 404 labeled "T2", table 406 labeled "T3", table 408 labeled "T4", table 410 labeled "T5", and table 412 labeled "T6". Only to illustrate the operation of an embodiment and not as a limitation thereon, tables 402-412 are depicted to include different numbers of columns. While the columns in each table are labeled C1, C2, C3, ..., Cn, such labeling is used only to distinguish the columns within a table. Such column labeling does not imply that columns with similar labels in different tables contain similar data. For example, column C1 in table T1 is distinct from column C2 in table T1, but column C1 in table T1 may or may not be similar to column C1 in table T2. Similarly, column C3 in table T4 is distinct from column C4 in table T4, but column C3 in table T4 may or may not be similar to column C3 in table T6, and so on. Any number of tables, a table having any number of columns can be similarly included in tenant 400.

Without implying a limitation on an embodiment and only for the clarity of the description, assume that the first column, C1, in a tenants' table contains the primary key for that table. For example, column C1 in table T1 contains the primary key for table T1, column C1 in table T2 contains the primary key for table T2, and so on. Of course, any one or more columns can similarly hold the primary key to a table.

Different base numbers can be used to design different dynamic table structures for the server side schema. For example, one dynamic structure emerges when an embodiment uses base 2 for certain determinations, and another dynamic structure emerges when the embodiment uses base 3. Different dynamic structures created using different bases according to an embodiment form a family of dynamic structures.

Using base 2 as an example for determining the dynamic structure, a binary label of a table with n column is the binary (base 2) number that equals to n−1. For example, table T1 has three columns. For n=3, n−1=2, whose base 2 representation is 10. This representation of n−1 is called a label. When the representation uses base 2, the representation is called a binary label. When the representation uses base 3, the representation is called a ternary label, and so on. Any base value can be used for computing a label for a given table of n columns.

Continuing with the example of base 2 method for computing a label for a table, the binary label is a primary binary label if the binary label consists of all 0 s except the leading 1. Any table, having any number of columns, and consequently any label, can be broken down into its constituent primary labels. For example, table T2 has four columns. Therefore, T2 has a label 11 (binary representation of 4-1). Label 11 can be broken down (partitioned) in to two primary labels, 1 and 10. Similarly, table T5 has seven columns and therefore binary label 110. Binary label 110 can be partitioned into two primary labels, 10 and 100.

Partitioning a tenant table follows from partitioning the tenant table's binary label into primary binary labels. A dynamic table structure in a server's schema—the multi-tenant database schema—is based on the primary labels, as will become clearer from the description of FIG. 5.

With reference to FIG. 5, this figure depicts an example dynamic table structure created for a multi-tenant database schema using base 2 labels in accordance with an illustrative embodiment. Multi-tenant database schema 500 can be used in place of schema 304 in FIG. 3. Tables 402-412 in FIG. 4 can be mapped to one or more columns in one or more tables in schema 500 without having to add null values in the rows of schema 500.

Schema 500 includes example tables 502, 504, 506, and 508, whose structure is defined dynamically by the selected base system, which is base 2 in this example. This example binary-table architecture is a member of a family of dynamic structures for multi-tenant database systems. Other members of the family can be created using a different base system in conjunction with this disclosure.

Example tenant schema 400 depicted in FIG. 4, is used to describe the construction of example multi-tenant database schema 500. Schema 500 includes four tables—502, 504, 506, and 508 to map data from six tables—402, 404, 406, 408, 410, and 412 of FIG. 4. The number of columns in each of tables 502, 504, 506, and 508 is determined by adding 1 to a progressively increasing exponent of 2, the base number.

Table 502 includes two columns because $1+2^0=2$.
Table 504 includes three columns because $1+2^2=3$.
Table 506 includes five columns because $1+2^2=5$.
Table 508 includes nine columns because $1+2^3=9$.

In general, a table in the set of tables used in binary-table architecture of schema 500 has a number of columns equal to $1+2^n$ where n ranges from 0 to a suitable value depending on the size of tenant schemas to be mapped. The selected value of n depends on the maximum number of columns in the tenants' tables being mapped, which maximum number itself complies with the limit on maximum number of columns in a table imposed by a particular database.

Once a value of n is selected, the example binary-table architecture includes n+1 tables in schema 500 to support the tenants' tables with maximum number of data columns $2^{n+1}$. In the depicted example, table 412 in FIG. 4 has the most number of data columns—eight. The number of tables in is sized to include eight (=2(2+1); therefore n=2) column tables, resulting in three (=2+1 for n=2) tables.

Thus, advantageously, in an embodiment, for the same set of tenant schemas, schema 500 contains fewer tables than all the tables in all tenant schemas. Schema 400 in FIG. 4 can be mapped to only schema 500 using only tables 502, 504, and 506. As in the example case depicted in FIG. 5, schema 500 includes additional table 508 to accommodate a table with more columns than table 412 in FIG. 4, such as from another tenant's schema (not shown). Additional or fewer tables in schema 500 may be justified depending on the particular tenants expected to be supported.

By similar reasoning, For example, setting n to a value of 6 enables seven server tables to fully consolidate tenants' tables with number of columns up to 128. For systems such as e-commerce hubs and data extraction systems, the number of columns in a tenant's schema can reach into the thousands, which, however, does not result in a significant increase in the number of tables needed in the binary-table architecture according to an embodiment, such as in schema 500. For example, a tenant table with 1000 columns can be supported by the binary-table architecture of schema 500 with only 11 tables (setting n to 10).

In some cases, a single-column table can be added to schema 500 if the tenant schema being mapped includes a single-column data. In a preferred embodiment, single-column table is ignored in schema 500, as tenant schemas with single-column data are uncommon in practice.

Note that a multi-tenant architecture built using the dynamic structure described with respect to schema 500 has to accommodate a variety of data types from the mapped tenants' tables. Sometimes, the data types or data structures used in a tenant's tables may not fit a particular data type available in the multi-tenant database. To avoid potential problems with mismatched data types an embodiment uses a flexible data type as table column type in schema 500. An example of such a flexible data type is VARCHAR. Using a flexible data type as the table column type in schema 500 allows convenient conversion from and to other types as may be used in a particular tenant's schema.

The family of dynamic structures according to an embodiment guarantees that there is always one and only one bijective mapping between a tenants' schemas and a multi-tenant database's schema, such as schema 500. Furthermore, a dynamic structure according to an embodiment ensures that no additional null values, other than null data already present in a tenant's table, are introduced in the multi-tenant database's tables.

The mapping is bijective in that the tenants' tables, after being stored in the multi-tenant database's dynamic structure schema, can be correctly reconstructed and retrieved. In addition, according to an embodiment, the mapping from tenants' schemas to the dynamic structure schema of an embodiment is global in a multi-tenant database and maintaining or consulting tenant-specific meta-data is therefore avoided.

As described earlier, a tenant, whose schema is mapped to schema 500, continues to see a view of schema 500 that corresponds to the tenant's schema. Furthermore, using schema 500, or a view thereof, a tenant can perform querying and DDL operations as if interacting with a dedicated database instance. For example, a tenant can add new tables with new schemas, modify existing table in the tenant's schema, or a combination of these and other similar schema manipulation operations using the dynamic structure of schema 500.

In one embodiment, a tenant's changes to the tenant's schema are accommodated without modifying schema 500. In such an embodiment, the changed tables or columns in the tenant's schema can simply be remapped to existing tables in schema 500.

In another embodiment, the dynamic structure of schema 500 can simply be extended on the same base system, if the dynamic structure of schema 500 was implemented with only a limited number of labels for some reason and change in a tenant's schema or a new tenant schema warrants such extending. Note that no tenant-schema-specific meta-data is needed to extend schema 500 or to map the tenant's schema to modified schema 500.

Figure 6:
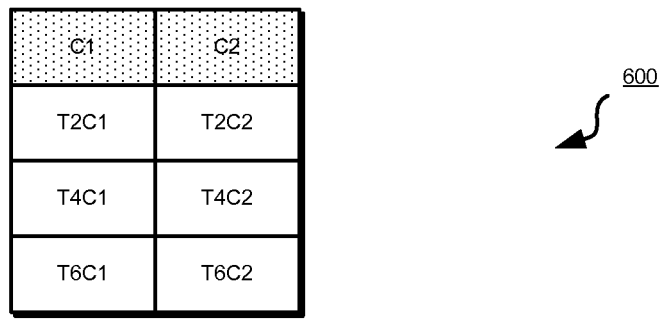
FIG. 6 depicts an example mapping of a tenant schema to a dynamic structure of a multi-tenant database schema in accordance with an illustrative embodiment.

With reference to FIG. 6, this figure depicts an example mapping of a tenant schema to a dynamic structure of a multi-tenant database schema in accordance with an illustrative embodiment. A tenant schema can be mapped to a dynamic structure schema of an embodiment using the primary labels associated with a table in the tenant's schema. An example operation is described in FIG. 6 using the example binary labels of tables 402-412 in tenant schema 400 in FIG. 4, and the base 2 system based dynamic structure of schema 500 of FIG. 5.

As described earlier, tables 502, 504, and 506 of schema 500 in FIG. 5 are the only three tables needed to map tables 402, 404, 406, 408, 410, and 412 of tenant schema 400 in FIG. 4. Schema 600 includes tables 602, 604, and 606, which correspond to tables 502, 504, and 506 respectively in schema 500 in FIG. 5. Each table in schema 600 has a binary label that is itself a primary label. For example, table 602 has a binary label 1, which is a primary label. Similarly, table 604 has a binary label 10, which is also a primary label, and table 606 has a binary label 100, which is a primary label as well.

Tenant table T5, 410 in FIG. 4, has a binary label 110, as described earlier. Binary label 110 can be partitioned into two primary labels, 10 and 100. Tables 604 and 606 in schema 600 correspond to primary labels 10 and 100 respectively. Accordingly tenant table T5 can be partitioned and mapped to tables 604 and 606.

Note that a primary key of a tenant table is made unique in schema 600 during the mapping or before the mapping. As an example, and without implying a limitation on the illustrative embodiments as to a method of making a primary key unique, a primary key of a tenant table can be prefixed or post-fixed with a tenant identifier, making the combination of the primary key and the tenant identifier unique in schema 600. As an example, entry 608 in table 604 is "T5C1" and denotes the content of column C1 of table T5 in FIG. 4. Column C1 is an example primary key for table T5 in FIG. 4, and is prefixed with "T5" to make "T5C1" unique in schema 600. "T5" may be an identifier associated with a tenant, a tenant table, or both. In one embodiment, "C1" is prefixed with "T5" to form "T5C1" before column 1 of table T5 is replicated to table 604 as entry 608.

Other ways of making a key unique in schema 600 will be apparent from those of ordinary skill in the art from this disclosure and the same are contemplated within the scope of the illustrative embodiments. For example, in one embodiment, the contents of column C1 in table T5 may be hashed or encrypted with a specific key to generate unique entry 608. Recovering C1 from the hashed or encrypted entry 608 is known in the art. Column data from a tenant table can be identified uniquely in schema 600 in a similar manner.

Because table T5 in FIG. 4 is mapped to tables 604 and 606, entry 610 in table 606 is a copy of the unique entry 608 in table 604. Once the primary key of a tenant table is thus replicated in the mapped tables of schema 600, other columns of table T5 are mapped to tables 604 and 606 in any suitable manner. For example, in one embodiment, the remaining columns C2, C3, C4, C5, C6, and C7 of table T5 are mapped from left to right to tables 604 and 606 in ascending order of the size of tables 604 and 606. Accordingly, C2 and C3 of T5 occupy table 604, as shown in entries 612 and 614 respectively of table 604; C4, C5, C6, and C7 occupy entries 616, 618, 620, and 622 in table 606 as shown.

In another example embodiment (not shown), the remaining columns C2, C3, C4, C5, C6, and C7 of table T5 are mapped from right to left to tables 604 and 606 in ascending order of the size of tables 604 and 606. Accordingly, C6 and C7 of T5 occupy table 604 in entries 612 and 614 (not shown); C2, C3, C4, and C5 occupy entries 616, 618, 620, and 622 in table 606 (not shown).

In another example embodiment (not shown), the remaining columns C2, C3, C4, C5, C6, and C7 of table T5 are mapped based on some other criterion, such as the data size of those columns, to tables 604 and 606 in some other order, such as relative size of data contents of tables 604 and 606. Accordingly, C2 and C7 of T5 occupy table 604 in entries 612 and 614 (not shown); C3, C4, C5, and C6 occupy entries 616, 618, 620, and 622 in table 606 (not shown). Those of ordinary skill in the art will be able to identify other mapping criteria from this disclosure and the same are contemplated within the scope of the illustrative embodiments.

With reference to FIG. 7, this figure depicts another example dynamic table structure created for a multi-tenant database schema using base 3 labels in accordance with an illustrative embodiment. Multi-tenant database schema 700 can be used in place of schema 500 in FIG. 5. Tables 402-412 in FIG. 4 can be mapped to one or more columns in one or more tables in schema 700 without having to add null values in the rows of schema 700.

Schema 700 includes example tables 702, 704, 706, 708, 710, and 712 whose structure is defined dynamically by the selected base system, which is base 3 in this example. This example ternary-table architecture is another member of a family of dynamic structures for multi-tenant database systems according to the illustrative embodiments.

Ternary-table architecture uses tables with $(1+3^n)$ number of columns where n ranges from 0 to some suitable value of n as described with respect to FIG. 5. The value of n is set with similar considerations as that for binary-table architecture of FIG. 5. When a value of n is chosen, the ternary-table architecture includes $2*(N+1)$ tables that support the tenants' tables with number of columns up to $3^{(N+1)}$. Schema 700 includes two sets of tables (the multiplier 2 in $2*(N+1)$ is =3−1, where 3 is the base number).

A table in each set includes 2 $(1+3^0)$, 4 $(1+3^1)$, $10(1+3^2)$ number of columns. For example, tables 702 and 704 each include two columns, tables 706 and 708 each include four columns, and tables 710 and 712 each include ten columns.

With reference to FIG. 8, this figure depicts another example mapping of a tenant schema to a dynamic structure of a multi-tenant database schema in accordance with an illustrative embodiment. Schema mapping in a ternary architecture is similar to that in binary architecture with the exception that ternary labels are used to map to ternary architecture. The illustration of FIG. 8 uses schema 700 in FIG. 7 and tenant schema 400 in FIG. 4 using the ternary labels of tenant tables 402-412 in FIG. 4.

A ternary label of a table with n column is the ternary (base 3) number that equals to n−1. As shown in FIG. 4, tenant table T6 has eight columns and therefore a ternary label 21 (base 3 representation of 8−1=7). As an example in FIG. 7, since the server tables exist in pairs, a suffix, such as 1 or 2, added to the ternary labels of the tables in schema 700 distinguishes between the tables with the same ternary label. Of course, any other manner of distinguishing between ternary tables in schema 700 can be used and is contemplated within the scope of the illustrative embodiments. Use of suffixes 1 and 2 is continued through the remainder description for the ease of understanding the operation.

A primary ternary label is a ternary label consisting of only 0 s except the leading 1. Partitioning a tenant table follows from decomposing the ternary label of the tenant table to primary ternary labels. In an embodiment, priority mapping is given to ternary labels having suffix 1. For example, tenant table T6 in FIG. 4 has ternary label 21, which can be decomposed into 1__1, 10__1 and 10__2. Accordingly tenant table T6 is partitioned into tables 702, 706 and 708 in schema 700. Other details as to the uniqueness of the key and column data from tenant tables upon replication into schema 700 follow similar logic as described with respect to FIG. 6.

The embodiments describing binary and ternary dynamic structures for multi-tenant database schemas can be generalized to an M-nary dynamic structure, where M is any natural number. M-nary dynamic structure includes M−1 sets of tables having $M^0, M^1, M^2, \ldots, M^{(n-1)}$, and $M^n$ number of columns where n is some natural number. Such architecture has (M−1)*(n+1) number of tables that support tenants' tables with maximum $M^{(n+1)}$ number of columns.

The selection of M can be based, for example, on the estimated workload for the multi-tenant database. Generally, the higher the value of M, the lower the average workload for each of the multi-tenant database's tables and the smaller the maximum number of column of the multi-tenant database's tables.

Schema mapping in an M-nary architecture is based on M-nary labels derived from the tenant tables. Again as an example, to distinguish multi-tenant database's schema tables with the same M-nary label, distinct numbers can be suffixed to the labels. Other ways of distinguishing tables with the same M-nary labels are also contemplated within the scope of the illustrative embodiments.

An M-nary label having all 0 s except the leading 1 is referred to as a primary M-nary label. By decomposing an M-nary label into the constituent primary M-nary label, mapping of the corresponding tenant table partitions into the dynamic structure of the multi-tenant database's schema can be determined in the manner described earlier.

In addition, an embodiment maintains the following orders for the mapping to be unique: (a) The multi-tenant database schema tables are ordered in the ascending order of their M-nary labels, which is consistent with the order of columns from left to right in the tenant tables. (b) The order of columns within each multi-tenant database schema table is consistent with that within the tenant tables. (c) When decomposing an M-nary label into primary M-nary labels, priority is given to primary M-nary labels with smaller suffix. These orders are described only as example implementation in an embodiment and not as a limitation on the illustrative embodiments. Those of ordinary skill in the art will be able to conceive other variations of these orders, as described with respect to FIG. 6, and the same are contemplated within the scope of the illustrative embodiments.

Figure 9:
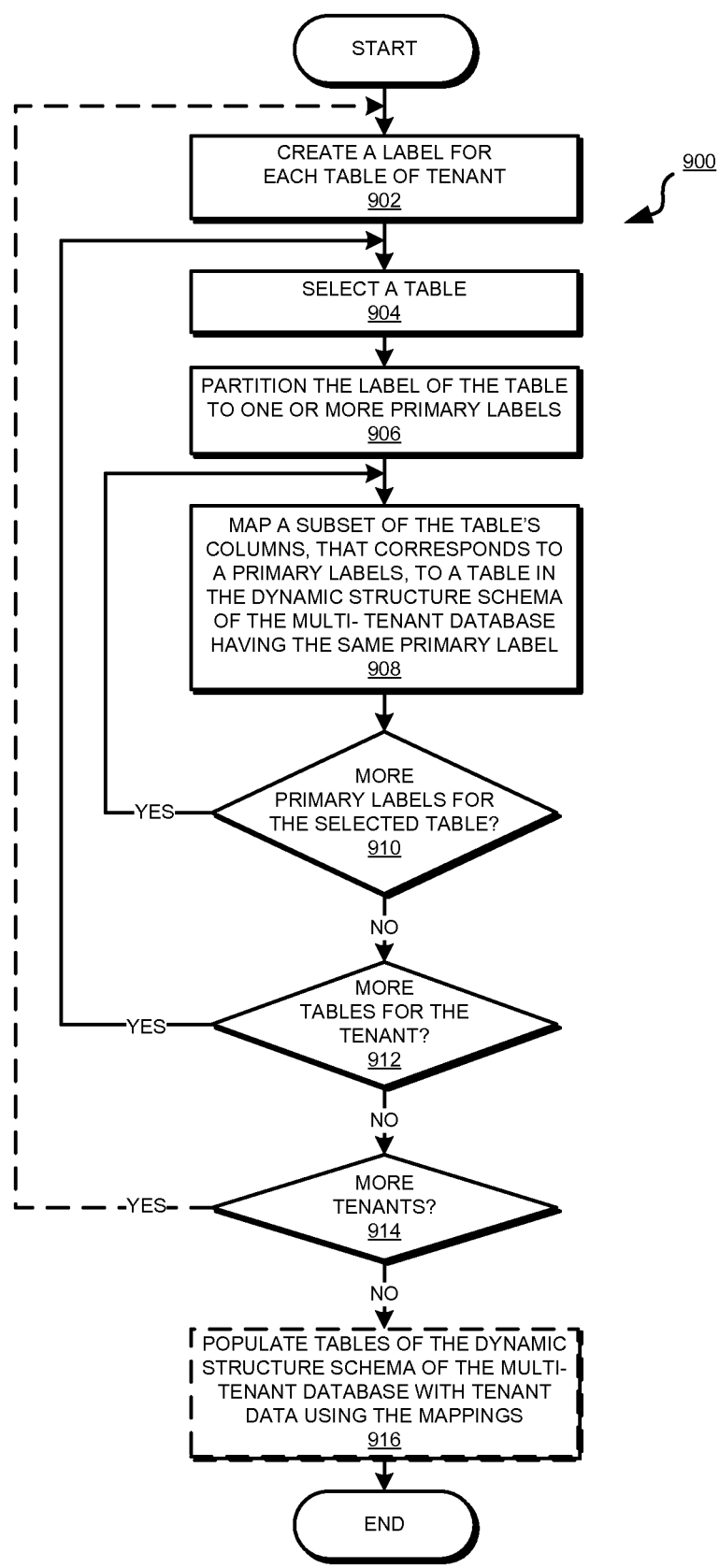
FIG. 9 depicts a flowchart of an example process of mapping a tenant schema to a dynamic structure of a multi-tenant database schema in accordance with an illustrative embodiment.

With reference to FIG. 9, this figure depicts a flowchart of an example process of mapping a tenant schema to a dynamic structure of a multi-tenant database schema in accordance with an illustrative embodiment. Process 900 can be implemented in a schema design tool, such as a schema design tool associated with multi-tenant database 105 in FIG. 1. Alternatively, process 900 can be implemented in a software application of another suitable type, such as an application that executes on client 110 (not shown).

For a given tenant schema, process 900 begins by creating a label according to a selected base system for each table in the tenant schema (step 902). Process 900 selects a table from the tenant schema (step 904).

Process 900 partitions the label of the selected tenant table into the constituent one or more primary labels (step 906). Process 900 maps a subset of the tenant table's columns, that correspond to one of the partitioned primary labels, to a table in a multi-tenant database's dynamic structure schema having the same primary label (step 908).

Process 900 determines whether more primary labels, and consequently more columns, remain to be mapped for the selected tenant table (step 910). If more primary labels remain to be mapped ("Yes" path of step 910), process 900 returns to step 908 and selects another primary label partitioned from the table's label.

If no more primary labels remain ("No" path of step 910), process 900 determines whether more tables in the tenant schema remain to be mapped to the dynamic structure schema of the multi-tenant database (step 912). If more tenant table remain ("Yes" path of step 912), process 900 returns to step 904 and selects another tenant table.

If no more tenant tables remain ("No" path of step 912), process 900 may optionally determine whether more tenant schemas remain to be mapped to the dynamic structure schema of the multi-tenant database (step 914). If more tenant schemas remain ("Yes" path of step 914), process 900 returns to step 902 and processes a remaining tenant schema. The iteration indicated by the "Yes" path of step 914 can be executed as a separate execution of process 900 at a different time.

If no more tenant schemas remain to be mapped ("No" path of step 914), process 900 populates the tables of the dynamic structure schema of the multi-tenant database with tenant data using the mappings (step 916). Process 900 ends thereafter. Step 916 may be executed as a separate process, distinct from the remainder of process 900.

While process 900 is described as a single process, those of ordinary skill in the art will understand that adding of tenants, mapping of tables, and other actions depicted in FIG. 9 can be performed incrementally, such as in distinct sub-processes that can be executed independently from each other. The depiction of FIG. 9 is not intended to imply that process 900 is to be executed in its entirety in a single stroke.

For example, process 900 may be executed for one tenant at one time, and for another tenant at a different time as and when the other tenant is added. As another example, the steps directed to populating the tables of the multi-tenant database can be performed separately, as in a separate process, from the mapping steps. Generally, process 900 can be reorganized, or split into sub-processes as may be suitable for a given implementation within the scope of the illustrative embodiments.

With reference to FIG. 10, this figure depicts a flowchart of a process of constructing a dynamic structure schema for a multi-tenant database in accordance with an illustrative embodiment. Process 1000 can be implemented in a manner similar to the implementation of process 900 in FIG. 9.

Process 1000 creates a set of tables for a dynamic structure schema of a multi-tenant database, each table having a label that is a primary label under a given M-nary system (step 1002). Process 1000 ends thereafter.

Those of ordinary skill in the art will understand from this disclosure that creation of tables according to process 1000 can an incremental process. For example, process 1000 may be executed once with a given set of tenants, and again at another time as and when existing tenant schemas change or new tenants arrive. Furthermore, executing process 1000 may or may not require an execution/re-execution of process 900 of FIG. 9 or a sub-process thereof. Such incremental executions of process 1000, and inter-related executions of process 900 or parts thereof of FIG. 9 are contemplated within the scope of the illustrative embodiments.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for creating a dynamic storage structure for efficient storage of data in multi-tenant database systems. The illustrative embodiments provide a family of dynamic structures for implementing a schema of a multi-tenant database to support tenant data with diverse schemas.

An embodiment allows a tenant to introduce data with a new schema or modify an existing schema without necessitating modification of the multi-tenant database's schema. To avoid waste of resources, the tenants' tables are fully consolidated into the tables in the multi-tenant database schema, without introducing any additional nulls due to schema heterogeneity. In addition, the worst case complexity to reconstruct a tenant table with n data columns from a dynamic structure schema of an embodiment is bounded by $O(\log(N))$. Efficient algorithms are provided in various embodiments for mapping tenants' schemas to a dynamic structure of a multi-tenant database's schema, without maintaining or consulting any tenant-specific meta-data.

While some embodiments are described using binary and ternary labels for mapping purposes, such labels are not intended to be limiting on the illustrative embodiments. For example, one of ordinary skill in the art may create the multi-tenant database schema as described herein, but use an alternate method for mapping table columns from a tenant schema to the multi-tenant database schema. For example, one manner of mapping may be to decompose a tenant table for best fit with one or more multi-tenant database schema tables such that no null values are introduced by such best fit. These and other manners of performing the mapping are contemplated within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "device," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for using a dynamic structure of tables in a schema of a multi-tenant database, the method comprising:
    creating, for a tenant schema including a set of tenant tables, a label for a tenant table in the set of tenant tables, wherein the tenant table includes a set of n columns, and wherein the label is formed by converting (n−1) to a representation in a selected base system;
    partitioning the label into a set of constituent primary labels;
    selecting a subset of columns from the set of n columns of the tenant table, the subset of columns corresponding to a primary label in the set of constituent primary labels;
    mapping the subset of columns to a table in the dynamic structure of tables in the schema of the multi-tenant database, the table in the dynamic structure of tables having the primary label; and
    populating, in the multi-tenant database executing in a data processing system, the dynamic structure of tables with data from the tenant schema according to the mapping.

2. The computer implemented method of claim 1, wherein the selected base system is 2.

3. The computer implemented method of claim 1, wherein a primary label in the set of constituent primary labels comprises a single 1 in the leading position.

4. The computer implemented method of claim 1, further comprising:
    creating the dynamic structure of tables in the schema of the multi-tenant database, such that a table in the dynamic structure of tables corresponds to a primary label under a selected M-nary base system where M is any natural number.

5. The computer implemented method of claim 4, wherein the m-nary base system is a base 3 system.

6. The computer implemented method of claim 4, further comprising:
    creating a set of (M−1) versions of a first table corresponding to first primary label; and
    uniquely identifying each version of the first table in the set of (M−1) versions such that the subset of columns is mapped to a first identified version in the set in priority over a second identified version in the set.

7. A computer usable program product comprising a computer readable storage device including computer usable code for using a dynamic structure of tables in a schema of a multi-tenant database, the computer usable code comprising:
    computer usable code for creating, for a tenant schema including a set of tenant tables, a label for a tenant table in the set of tenant tables, wherein the tenant table includes a set of n columns, and wherein the label is formed by converting (n−1) to a representation in a selected base system;
    computer usable code for partitioning the label into a set of constituent primary labels;
    computer usable code for selecting a subset of columns from the set of n columns of the tenant table, the subset of columns corresponding to a primary label in the set of constituent primary labels;
    computer usable code for mapping the subset of columns to a table in the dynamic structure of tables in the schema of the multi-tenant database, the table in the dynamic structure of tables having the primary label; and
    computer usable code for populating, in the multi-tenant database executing in a data processing system, the dynamic structure of tables with data from the tenant schema according to the mapping.

8. The computer usable program product of claim 7, wherein the selected base system is 2.

9. The computer usable program product of claim 7, wherein a primary label in the set of constituent primary labels comprises a single 1 in the leading position.

10. The computer usable program product of claim 7, further comprising:
    computer usable code for creating the dynamic structure of tables in the schema of the multi-tenant database, such that a table in the dynamic structure of tables corresponds to a primary label under a selected M-nary base system where M is any natural number.

11. The computer usable program product of claim 10, wherein the m-nary base system is a base 3 system.

12. The computer usable program product of claim 10, further comprising:
    computer usable code for creating a set of (M−1) versions of a first table corresponding to first primary label; and
    computer usable code for uniquely identifying each version of the first table in the set of (M−1) versions such that the subset of columns is mapped to a first identified version in the set in priority over a second identified version in the set.

13. The computer usable program product of claim 7, wherein the computer usable code is stored in a computer readable storage medium in a data processing system, and wherein the computer usable code is transferred over a network from a remote data processing system.

14. The computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

15. A data processing system for using a dynamic structure of tables in a schema of a multi-tenant database, the data processing system comprising:

a storage device including a storage medium, wherein the storage device stores computer usable program code; and a processor, wherein the processor executes the computer usable program code, and wherein the computer usable program code comprises:

computer usable code for creating, for a tenant schema including a set of tenant tables, a label for a tenant table in the set of tenant tables, wherein the tenant table includes a set of n columns, and wherein the label is formed by converting (n−1) to a representation in a selected base system;

computer usable code for partitioning the label into a set of constituent primary labels;

computer usable code for selecting a subset of columns from the set of n columns of the tenant table, the subset of columns corresponding to a primary label in the set of constituent primary labels;

computer usable code for mapping the subset of columns to a table in the dynamic structure of tables in the schema of the multi-tenant database, the table in the dynamic structure of tables having the primary label; and computer usable code for populating, in the multi-tenant database executing in the data processing system, the dynamic structure of tables with data from the tenant schema according to the mapping.

16. The data processing system of claim 15, wherein the selected base system is 2.

17. The data processing system of claim 15, wherein a primary label in the set of constituent primary labels comprises a single 1 in the leading position.

* * * * *